(12) United States Patent
Ryan

(10) Patent No.: US 7,300,269 B2
(45) Date of Patent: Nov. 27, 2007

(54) HEATER CONTROL FOR COTTON CANDY SPINNER HEAD

(75) Inventor: John J. Ryan, Edgewood, KY (US)

(73) Assignee: Gold Medal Products Company, Inc., Cincinnati, OH (US)

( * ) Notice: Subject to any disclaimer, the term of this patent is extended or adjusted under 35 U.S.C. 154(b) by 513 days.

(21) Appl. No.: 10/725,045

(22) Filed: Dec. 1, 2003

(65) Prior Publication Data
US 2005/0118314 A1    Jun. 2, 2005

(51) Int. Cl.
*A23G 3/00* (2006.01)
(52) U.S. Cl. .......................... 425/9; 425/160
(58) Field of Classification Search .............. 425/9, 425/135–150, 160; 426/660
See application file for complete search history.

(56) References Cited

U.S. PATENT DOCUMENTS

| | | | | |
|---|---|---|---|---|
| 3,125,967 A | * | 3/1964 | Bowe et al. | 99/331 |
| 3,203,365 A | * | 8/1965 | Bowe et al. | 425/9 |
| 4,872,821 A | | 10/1989 | Weiss | 425/9 |
| 5,441,754 A | | 8/1995 | Evans, Sr. | 426/483 |
| 5,498,144 A | | 3/1996 | Francis et al. | 425/9 |
| 5,766,643 A | | 6/1998 | Hammon | 425/9 |

* cited by examiner

*Primary Examiner*—Robert B. Davis
*Assistant Examiner*—Marissa W Chaet
(74) *Attorney, Agent, or Firm*—Wood, Herron & Evans, L.L.P.

(57) ABSTRACT

Within a cotton candy machine a delay-on-break delay timer is used to delay the de-energization of the spinner-head motor for a predetermined period of time after the heater elements are turned off. Thus, while the heater elements are cooling down, the motor and spinner head continue to rotate. Once the heater elements are cooled to the point where they cannot melt or burn the sugar, then the motor can be de-energized and the spinner head allowed to stop.

18 Claims, 3 Drawing Sheets

HEATER CONTROL FOR COTTON CANDY SPINNER HEAD

FIELD OF THE INVENTION

This invention relates generally to cotton candy machines, and more particularly to an improvement in cotton candy machines for preventing sugar from burning in the spinner head.

BACKGROUND OF THE INVENTION

Machines for spinning granular sugar into sugar filaments or so-called cotton candy are known and have been employed for some time to produce cotton candy. A typical cotton candy machine has a base which houses a motor which drives a rotatable shaft to which a spinner head is mounted. Bearings rotatably support the rotating shaft within the motor. Granular sugar is introduced into the spinner head which includes heating elements and the like for melting the granular sugar. The rotation of the spinner head causes the melted granular sugar to be spun or slung out of holes or slots in the spinner head and onto the inner surface of a bowl or basket mounted to the base of the cotton candy machine. The sugar filaments adhered to the basket may then be transferred to a paper tube or the like by rolling one end of the tube about the circumference of the basket to collect the cotton candy on the tube end.

A problem associated with cotton candy machines and one which adversely impacts the cleaning, operation and maintenance of the machines is that when the machine is turned off, the residual heat of the heating elements can burn sugar which remains in the spinner head. Such residual burned sugar is difficult to clean and can move, while hot, to areas distant from the heater so that it does not melt upon start-up, thereby adversely impacting operation and maintenance.

SUMMARY OF THE INVENTION

Embodiments of the present invention address this and other problems of conventional cotton candy machines by incorporating a delay timer that ensures the spinner head continues to rotate for a predetermined period of time once the heating elements have been turned off. Any sugar engaging the de-energized but still hot heater is melted and spun off. The spinning continues until the heater has cooled sufficiently so as to not melt, or burn, sugar.

One aspect of the present invention relates to a machine for spinning granular sugar into filaments. In particular, the machine includes a rotatable shaft, a motor for rotating the shaft when the motor is energized, a spinner head mounted on the shaft for rotation therewith and for melting granular sugar introduced thereinto. When operating, the spinner head directs molten sugar filaments radially outwardly therefrom. The spinner head also includes a heater element.

According to this aspect, the machine also includes a switch having a first state for energizing the heater element and the motor and a second state for de-energizing the heater element and the motor; and a delay circuit coupled with the switch and the motor. This delay circuit detects when the switch changes from its first state to its second state and, in response, prevents de-energizing the motor for a predetermined time period.

Another aspect of the present invention relates to a method for preparing cotton candy. According to this method, a motor is energized that rotates a spinner head for melting granulated sugar introduced thereinto, wherein the spinner head when rotating directs molten sugar filaments radially outward therefrom. Concurrently with, or optionally after, the energizing of the motor, a heater element that is located within the spinner head is energized as well. Next, input is received to de-energize said motor and said heater element and, in response to the received input, the heater element is de-energized but the motor is prevented from being de-energized for a predetermined period of time after de-energizing the heater element.

Yet a further aspect of the present invention relates to a machine for spinning granular sugar into filaments which includes a spinner head for melting granular sugar introduced thereinto and rotating means for rotating the spinner head. The spinner head includes heater means for producing heat and when the spinner head rotates it directs molten sugar filaments radially outwardly therefrom. The machine also includes changing means for changing the heater means and the rotating means from a respective energized state to a respective de-energized state; and delay means that prevents the changing means from de-energizing the rotating means for a predetermined time period after de-energizing the heater means.

One aspect of the present invention relates to a device for making cotton candy, wherein sugar is melted and spun into filaments. According to this aspect, the device includes a rotatable spinner head, an energizable heater operably disposed in said spinner head to melt sugar therein while the spinner head is rotating; and an apparatus for de-energizing the heater while said spinner heat is rotating. Accordingly, the heater is cooled while said spinner head is rotating.

Another aspect of the present invention relates to a method for making cotton candy. According to this method a heater element in a spinner head is energized; sugar is melted and so that filaments are spun from the spinner head; and then the heater element is de-energized while the spinner head is rotated until the heater element is cooled substantially below a temperature sufficient to burn, or alternatively melt, sugar.

BRIEF DESCRIPTION OF THE FIGURES

These and other objects and advantages of the present invention will become more readily apparent during the following detailed description taken into conjunction with the drawings herein, in which.

DETAILED DESCRIPTION OF THE INVENTION

Figure 1:
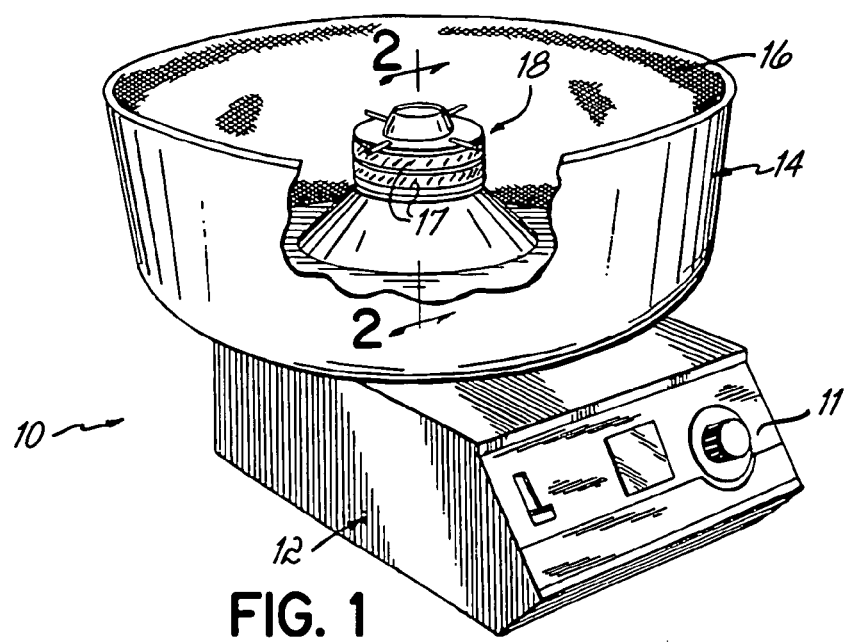
FIG. 1 is a perspective view of a cotton candy machine constructed in accordance with the principles of the present invention.
Figure 2:
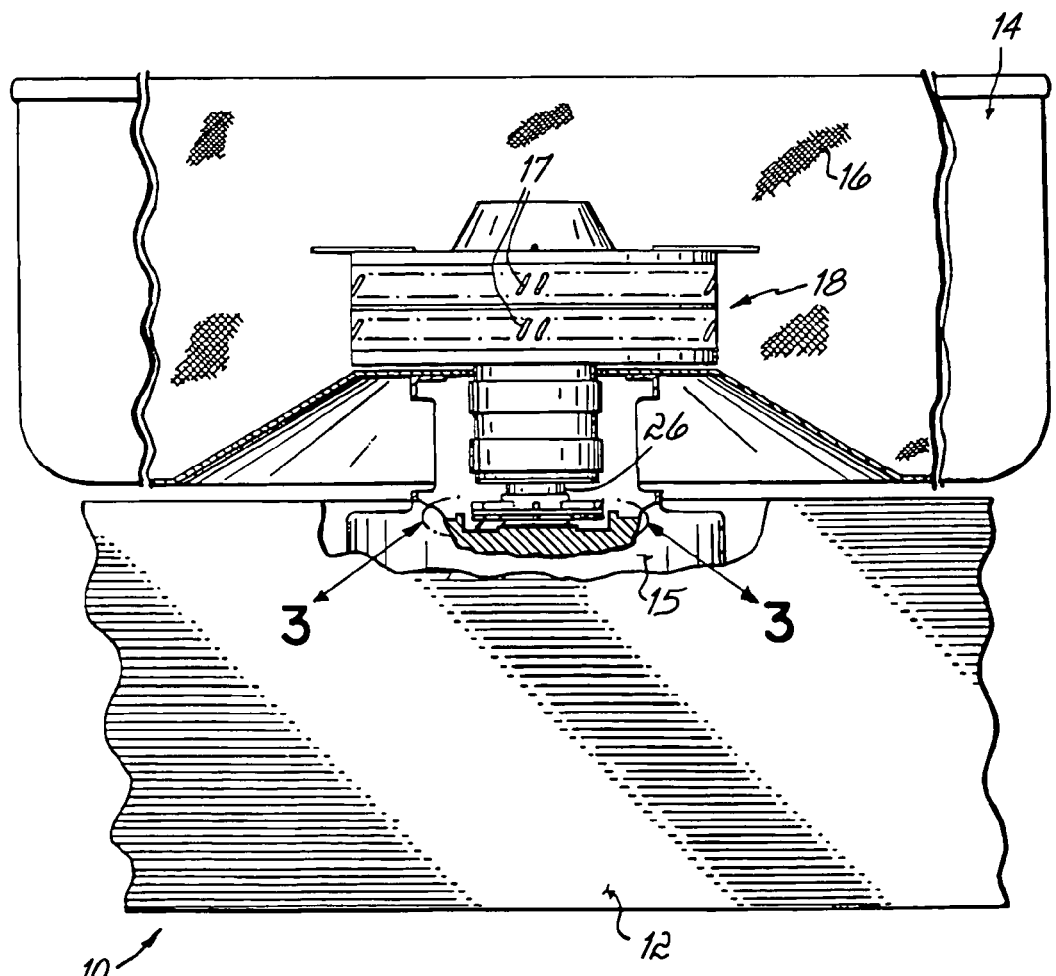
FIG. 2 is a partly broken away elevational view of the cotton candy machine of FIG. 1.
Figure 3:
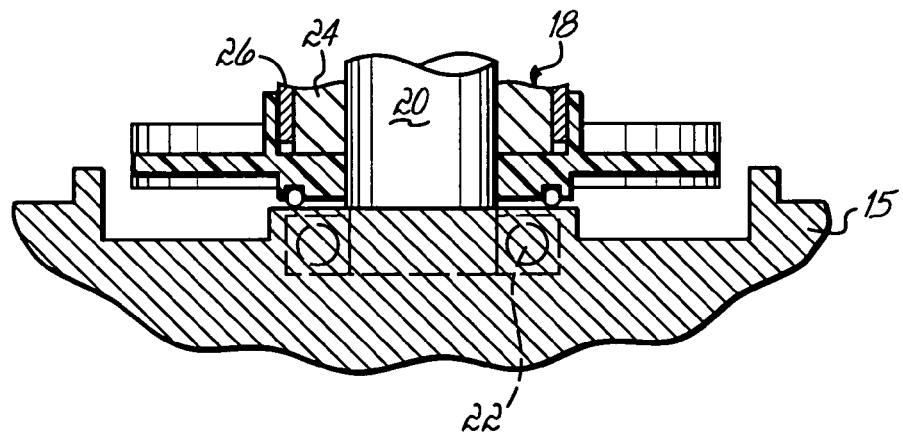
FIG. 3 is an enlarged view of the encircled area 3-3 of FIG. 2 according to an embodiment of the invention.

With reference first to FIG. 1 there is shown a cotton candy machine 10 of one type with which the invention may be used. The machine 10 includes a base 12 on which a basket or bowl 14 is mounted. The basket 14 includes a mesh insert 16 for catching cotton candy (not shown) as the cotton candy is formed. Referring to FIGS. 1-3, a motor shown diagrammatically at 15 supports a rotatable spinner head 18. Spinner head 18 includes a heating element or the like (not shown) to melt granular sugar which is introduced thereinto. In operation rotating spinner head 18 causes melted sugar to be thrown out of or otherwise ejected from slots 17 in the form of filaments. The sugar filaments collect on the mesh insert 16. The details of spinner head 18 are known generally to those skilled in the art and are not described or shown in great detail herein.

The lower end of spinner head 18 is mounted to a rotatable shaft 20. That shaft 20 is supported by bearings shown diagrammatically at 22 within motor 15. The spinner head 18 includes an upright base or skirt portion 24 surrounded by a cylindrical sleeve insulator 26. As shown in FIG. 1, a control panel 11 is provided so that an operator can turn the machine 10 on and off, turn the motor 15 and heater elements on and off, and control the variable temperature of the heater elements. One of ordinary skill in this field of endeavor would readily appreciate that the control panel 11 can include a number of different controls which can be located at various locations relative to the machine 10. In particular, the panel 11 will at least include a master switch and a motor and heat switch.

It will be appreciated that the spinner head 18 of the present invention can utilize a variety of perforated bands and heating elements which may have different elements than those depicted in FIGS. 1-3. For example, a spinner head using a tubular heat element may be used according to one embodiment of the present invention. The details of the perforated band and the heater are known generally to those skilled in the art and are not described or shown in great detail herein. Further details of a typical construction of the perforated band and the heater element can be seen in U.S. Pat. Nos. 4,872,871, 5,441,754, 5,498,144 and 5,766,643 all of which are assigned to the assignee of the present invention and incorporated herein by reference, in their entirety. It will also be appreciated that the spinner head 18 of the present invention can be used with a cotton candy machine having a single perforated band and heater or for machines with multiple perforated bands and heaters. Spinner heads having multiple bands and heaters are disclosed in U.S. Pat. Nos. 5,441,754 and 5,498,144 and other suitable forms of spinner heads and heaters could be used as well.

The various cotton candy machines just described include a motor and heater elements that are energized and de-energized substantially at the same time. When the motor is turned off, the spinner head stops rotating rather quickly relative to how long it takes the heater elements to cool after they are de-energized. Accordingly, granulated sugar or partially molten sugar within the spinner head continues to be warmed by the residual heat of the heater elements but cannot be flung into filaments because the spinner head no longer rotates. As a result, a portion of the sugar in the spinner head can easily burn and/or clog the openings of the spinner head.

To remedy this situation, a delay-on-break delay timer is used to delay the de-energization of the spinner-head motor for a predetermined period of time after the heater elements are turned off. Thus, while the heater elements are cooling down, the motor continues to rotate the spinner head. Once the heater elements are cooled to the point where they cannot melt or burn the sugar, then the motor can be de-energized thereby allowing the spinner head to stop. This predetermined time period is approximately 30 seconds but can vary based on the specific cotton candy machine, heater elements, and temperature settings. While sugar's physical characteristics can vary for a variety of reasons such as, for example, ambient barometric pressure and ambient humidity sugar used in cotton candy machines typically melts between 210° F. and 225° F. and typically burns at temperatures above 370° F.

Figure 4:
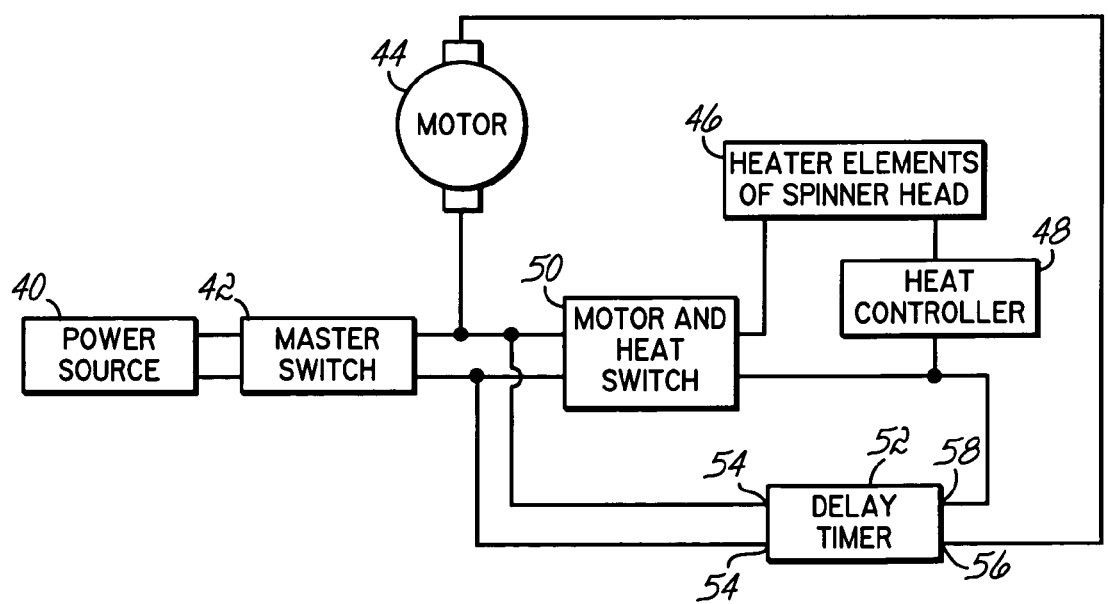
FIG. 4 is a schematic of an exemplary embodiment of the present invention using a cotton candy machine similar to that of FIG. 1.

FIG. 4 illustrates a schematic-level view of an exemplary embodiment of the present invention. As the functions and operation of many of the elements of a cotton candy machine have already been described in detail, only a cursory summary of these familiar elements is provided below in describing FIG. 4.

A power source 40, such as a conventional commercial or residential 3-wire service, is used to provide the electrical power to the cotton candy machine 38. A master switch 42 is used to power-on and power-off the machine 38. As would be apparent to a skilled artisan from the drawing, the master switch 42 can interrupt the power being provided to all the other components of the cotton candy machine 38.

A motor 44, when energized, imparts rotational motion to the spinner head (not shown in FIG. 4) of the cotton candy machine 38. The spinner head includes one or more heater elements 46 that, when energized, provide the heat needed to melt granulated sugar introduced into the spinner head.

The cotton candy machine 38 includes a motor and heater switch 50 that turns on or off the motor 44 and the heater elements 46. When the switch 50 is in one state (e.g., "on"), a complete electrical circuit is provided between the power source 40 and both the heater elements 46 and the motor 44. In another state (e.g., "off"), this electrical circuit is interrupted so as to de-energize the heater elements 46 and the motor 44.

However, the delay timer 52 controls the timing of how the heater elements 46 and the motor 44 change from an energized state to a de-energized state whenever the motor and heater switch 50 changes from "on" to "off".

Delay timer 52 is preferably a "delay on break" timer as is known and understood by a skilled artisan. While delay timer 52 is described herein in one particular configuration, one of ordinary skill will appreciate that different, but functionally-equivalent, delay timers of other forms can be substituted along with appropriate wiring changes without departing from the scope of the present invention.

The delay timer 52 includes a power input 54. This input 54 provides the necessary electrical connectivity for the delay timer 52 to operate as intended. An initiate, or sense, input 58 monitors an input line and is how the delay timer 52 determines when to start the timer for a delay period. For example, while the motor and heater switch 50 is "on", the electrical wire into input 58 provides a current (or voltage) indicative of power being present at the delay timer 52. However, once the switch 50 is turned off, the absence of the electrical parameter being sensed (i.e., current or voltage) will be indicative of a no-power condition at the input 58. When the delay timer 52 determines no electrical power, or in other words a break condition, exists at the input 58, then timer circuitry (not shown) within the delay timer initiates.

While the timer circuitry delays for a pre-set time period, power continues to be supplied over the electrical connection from the output 56 to the motor 44 even though the switch 50 is in the "off" position. Once the pre-set time period expires, the delay timer 52 interrupts the power from the output 56 so as to de-energize the motor 44.

Typically a delay timer 52 will include a relay or triac that, during a delay period, bridges power, for example from the input 54, to an output such as output 56. When the delay time-period expires, then the delay timer 52 simply deactivates the relay or triac so that the output 56 becomes isolated from any power source. As can be appreciated from the schematic, the master switch 42 can be used to turn off both the motor 44 and the heater elements 46 concurrently with one another irrespective of the operation of either the delay timer 52 or the motor and heater switch 50.

Delay timers are usually programmable so that the pre-set time period can be adjusted relatively easily. Typical delay timers which would have use in the schematic of FIG. 4 have delay periods which range from milliseconds to minutes and even hours. Accordingly, a wide range of delay times can be affected within the exemplary cotton candy machine 38. As described earlier, the delay time-period selected is one that is sufficient to delay the stopping of the motor so as to prevent any sugar within the spinner head from burning. The particular delay time-period selected can vary depending on such factors as the heater elements' capacity and wattage, the heater elements' thermal mass, the heater elements' heat conduction ability, and the material from which the heater elements are constructed.

While not shown in the figures, the delay timer can have a control input which permits an operator to adjust the delay time. Thus, the delay timer can be manufactured with a default delay setting which can be adjusted during operation.

An optional heat controller 48 is depicted in FIG. 4 as well. This controller 48 allows an operator to adjust the temperature of the heater elements 46. Typically such a controller 48 includes a variable resistive element or sine-wave phase control so as to vary the electrical power being delivered to the heater elements 46 which, then, correlates to varying the temperature of the element 46.

Figure 5:
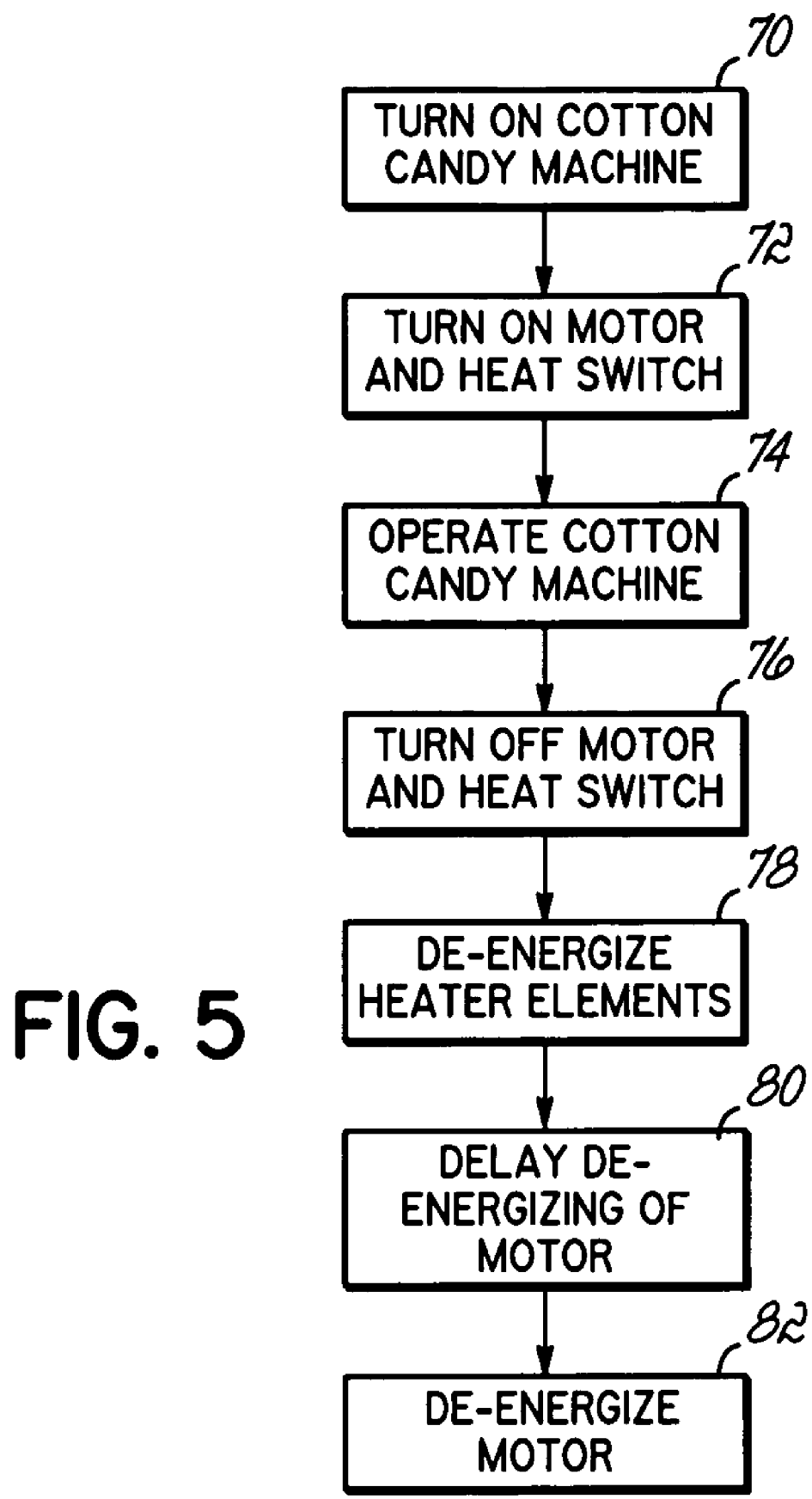
FIG. 5 is an exemplary flowchart detailing operation of the cotton candy machine of FIG. 4.

FIG. 5 depicts an exemplary flowchart for the operation of the cotton candy machine of FIG. 4. In step 70, the cotton candy machine is turned on and then the motor and heater elements are turned on in step 72. While the motor and heater elements can be energized concurrently, it is also contemplated that the heater elements are not energized until some time after the spinner head starts to rotate. Next, in step 74, the cotton candy machine is operated normally to produce cotton candy.

When an operator desires to power-down the cotton candy machine, the motor and heater switch is turned off in step 76. As a result of this switch being turned off, the cotton candy machine, in step 78, interrupts electrical power to the heater elements thereby de-energizing them.

Also, as a result of the motor and heater switch being turned off, a delay timer is activated which, in step 80, prevents de-energizing the motor so as to allow the spinner head to keep rotating while the heating elements are cooling. At the end of some predetermined time period, the delay timer will no longer prevent disabling the motor but, instead, in step 82, will interrupt the electrical power to the motor so as to stop the spinner head from rotating.

Because the spinner head continues to rotate even after the heater elements have been de-energized, sugar within the spinner head is prevented from burning and/or clogging the openings of the spinner head.

Those skilled in the art will readily recognize numerous adaptations and modifications which may be made to the cotton candy machine of the present invention and which will result in an improved cotton candy machine, yet all of which will fall within the spirit and scope of the present invention as defined in the following claims. Accordingly, the invention is to be limited only by the scope of the following claims and their equivalents.

What is claimed is:

1. A machine for spinning granular sugar into filaments comprising:

a rotatable shaft;

a spinner head mounted on said shaft for rotation therewith and for melting granular sugar introduced thereinto, said spinner head when rotating being operable to direct molten sugar filaments radially outwardly therefrom;

said spinner head further comprising a heater element;

a motor for rotating said shaft when said motor is energized;

a first switch having a first state for respectively energizing said heater element and said motor and a second state for respectively de-energizing said heater element and said motor; and a delay circuit coupled with said first switch and said motor and configured to detect when said first switch changes from said first state to said second state and, in response, prevents de-energizing said motor for a predetermined time period.

2. The machine according to claim 1, further comprising:

a second switch having a third state for energizing said heater element and said motor and a fourth state for concurrently de-energizing said heater element and said motor, wherein said second switch operates independently of said first switch and said delay circuit.

3. The machine according to claim 1 further comprising:

a temperature controller coupled with said heater element and configured to adjust electrical power delivered to said heater element.

4. The machine according to claim 1, further comprising:

a temperature controller coupled with said heater element and configured to vary a temperature of said heater element.

5. The machine according to claim 1, wherein the predetermined time period is substantially 30 seconds.

6. The machine according to claim 1, wherein the predetermined time period is between substantially 15 seconds and substantially one minute.

7. The machine according to claim 1, wherein the predetermined time period is of sufficient duration to prevent any molten or non-molten sugar within said spinner head from burning.

8. The machine according to claim 1, wherein said heater element further comprises more than one heater coil.

9. The machine according to claim 1, wherein said heater element further comprises:

a ribbon of resistance wire.

10. The machine according to claim 1, wherein said heater element further comprises:

a tubular heat element.

11. A machine for spinning granular sugar into filaments comprising:

a spinner head for melting granular sugar introduced thereinto, said spinner head when rotating being operable to direct molten sugar filaments radially outwardly therefrom;

said spinner head including heater means for producing heat;

rotating means for rotating said spinner head;

changing means for changing said heater means and said rotating means from a respective energized state to a respective de-energized state; and delay means for preventing said changing means from de-energizing said rotating means for a predetermined time period after de-energizing said heater means.

12. The machine according to claim 11, wherein the predetermined time period is substantially 30 seconds.

13. The machine according to claim 11, wherein the predetermined time period is between substantially 15 seconds and substantially one minute.

14. The machine according to claim 11, wherein the predetermined time period is of sufficient duration to prevent any molten or non-molten sugar within said spinner head from burning.

15. The machine according to claim 11, wherein the delay means is configured to continue providing electrical power to said rotating means for said predetermined time period.

16. A device for making cotton candy, wherein sugar is melted and spun into filaments, said device comprising:

a rotatable spinner head;

an energizable heater operably disposed in said spinner head to melt sugar therein while said spinner head is rotating; and an apparatus, including a delay circuit, for de-energizing said heater while said spinner head is rotating, wherein said heater is cooled while said spinner head is rotating.

17. The device according to claim 16, said heater is cooled substantially below a temperature sufficient to melt sugar while said spinner head is rotating.

18. The device according to claim 16, said heater is cooled substantially below a temperature sufficient to burn sugar while said spinner head is rotating.

* * * * *

UNITED STATES PATENT AND TRADEMARK OFFICE
CERTIFICATE OF CORRECTION

| | | |
|---|---|---|
| PATENT NO. | : 7,300,269 B2 | Page 1 of 1 |
| APPLICATION NO. | : 10/725045 | |
| DATED | : November 27, 2007 | |
| INVENTOR(S) | : John J. Ryan | |

It is certified that error appears in the above-identified patent and that said Letters Patent is hereby corrected as shown below:

In column 4, line 2, change "ambient humidity sugar" to --ambient humidity, sugar--.

In column 8, claim 17, line 8, change "said heater" to --wherein said heater--.

In column 8, claim 18, line 11, change "said heater" to --wherein said heater--.

Signed and Sealed this

Tenth Day of June, 2008

JON W. DUDAS
*Director of the United States Patent and Trademark Office*